United States Patent [19]

Frazer

[11] 4,449,102

[45] May 15, 1984

[54] ADAPTIVE THRESHOLD CIRCUIT

[75] Inventor: Gerald L. Frazer, Atkinson, N.H.

[73] Assignee: Bell Telephone Laboratories, Incorporated, Murray Hill, N.J.

[21] Appl. No.: 358,310

[22] Filed: Mar. 15, 1982

[51] Int. Cl.³ .................... H03K 5/08; H03K 5/153
[52] U.S. Cl. ............................ 328/162; 307/268; 307/359; 328/147; 328/164
[58] Field of Search .............. 307/268, 359; 328/147, 328/162, 164, 165

[56] References Cited

U.S. PATENT DOCUMENTS

| | | | |
|---|---|---|---|
| 3,404,232 | 10/1968 | Burford | 328/162 |
| 3,534,273 | 10/1970 | Thomas | 328/162 |
| 3,588,714 | 6/1971 | McIntosh | 378/164 |
| 3,721,959 | 3/1973 | George | 328/162 |
| 4,326,169 | 4/1982 | Fenderson et al. | 328/164 |
| 4,377,759 | 3/1983 | Ohhata et al. | 328/162 |
| 4,417,213 | 11/1983 | Ito | 328/164 |

OTHER PUBLICATIONS

M. A. Byington et al., "Design and Performance of 16-State Digital Modem" ICC Conference Record, vol. 1, 1979, pp. 5.4.1-5.4.6.

M. Washio et al., "1.6Gb/s 16-Level Superposed APSK Modem with Baseband Signal-Processing Coherent Demodulator", IEEE MTFS International Microwave Symposium, Dec. 1978, pp. 945-951.

W. B. Gaunt et al., "The D3 Channel Bank" Bell Laboratories Record, Aug. 1972, pp. 229-233.

Primary Examiner—John Zazworsky
Attorney, Agent, or Firm—David R. Padnes

[57] ABSTRACT

The adaptive threshold circuit (FIG. 1) senses the amplitude of a digital signal relative to a threshold and generates a corresponding output signal therefrom. Feedback circuitry generates a correction signal which drives the threshold toward a predetermined level in the signal-eye pattern. This predetermined level passes only through the region of intersymbol interferene in the signal-eye pattern.

10 Claims, 4 Drawing Figures

ADAPTIVE THRESHOLD CIRCUIT

TECHNICAL FIELD

This invention relates to a digital transmission system and, in particular, to receiver apparatus which quantizes a digital signal with respect to a threshold which is maintained at a constant position relative to the digital signal levels.

BACKGROUND OF THE INVENTION

Digital signals generate so-called "signal-eyes" of changing dimensions and positions which are separated by a region of intersymbol interference. Such signal-eyes are defined by the ensemble of all signal waveforms over the baud interval. For n signal levels, where n is an integer, n-1 vertically stacked signal-eyes are formed in the voltage-time domain. In an idealized digital transmission system, all signal transitions converge at an optimum sampling instant to points between the signal-eyes. These points will hereinafter be referred to as "points of convergence". In actual digital transmission systems, the signal distortions vary and are unpredictable. As a result, the signal transitions do not converge to points between the signal-eyes.

The use of digital transmission systems requires the ability to regenerate the transmitted signal after it has traveled through a noisy dispersive medium. Threshold circuits, which sense the amplitude of the digital signal with respect to a threshold, are used in the regeneration process. Preferably, the threshold circuit is adaptive, i.e., it automatically maintains the threshold at a constant position relative to the signal-eyes.

In one adaptive threshold circuit application, a comparator within the threshold circuit senses the digital signal with respect to a threshold passing through the signal-eyes. The output of the comparator is also coupled to feedback circuitry which automatically maintains the threshold at a predetermined position within the signal-eyes for minimum regeneration errors. This predetermined position is typically at the center of a signal-eye. Existing threshold circuitry of the type described suffers from several limitations. First, the feedback circuitry utilized requires precise analog reference signals. Second, the choice of the analog reference signal is affected by the degree of Nyquist filtering used to control the digital signal pulse shape.

In another signal regeneration application, threshold circuits are used to provide an error signal which drives adaptive transversal equalizers. This error signal is defined as the polarity of the difference between an actual digital signal and an idealized digital signal at the sampling instant. Circuits used in this second application suffer from the previously discussed limitations and, in addition, are not adaptive.

SUMMARY OF THE INVENTION

In accordance with the present invention, an adaptive threshold circuit compares the amplitude of a digital signal relative to a threshold at sampling times which coincide with the signal-eyes. Preferably, these sampling times coincide with the times of maximum signal-eye opening. This comparison provides a 2-level output signal. The output signal is also used to generate a correction signal which drives the threshold toward a predetermined level passing only through the region of intersymbol interference surrounding the signal-eyes. Typically, this predetermined level passes through a point which corresponds to a point of convergence in an idealized signal-eye pattern. Accordingly, the present invention can be utilized to provide an ideal signal for driving adaptive transversal equalizers as well as to distinguish between the digital signal levels at prescribed sampling times.

A feature of the present invention is that correction signal generation does not require precise analog reference signals.

DETAILED DESCRIPTION

Figure 1:
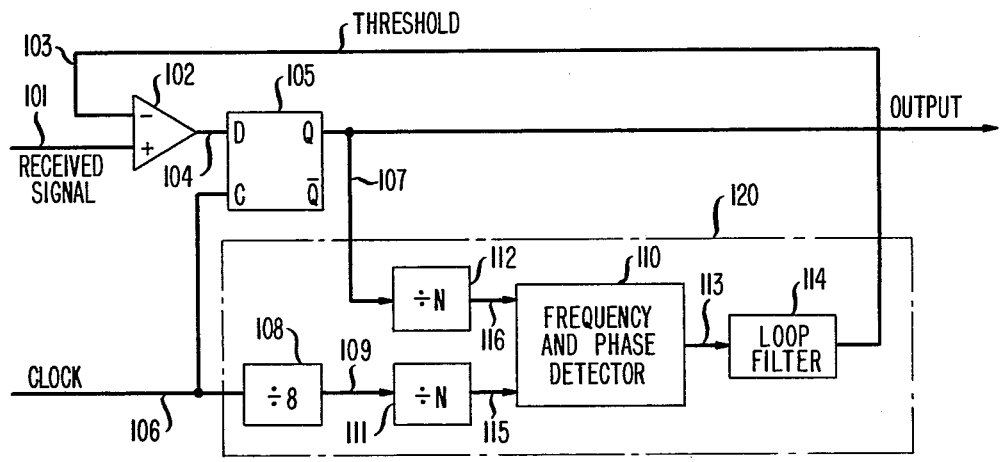
FIG. 1 is a schematic block diagram in accordance with the present invention.

An illustrative adaptive threshold circuit in accordance with the present invention is shown in FIG. 1. Input lead 101 of comparator 102 receives a digital signal, such as a quaternary signal. Comparator 102 senses the amplitude of the digital signal relative to a threshold amplitude on lead 103 and generates an output signal on lead 104. The amplitude of the output signal on lead 104 is at a first state, e.g., "high" or logic "1", if the digital signal amplitude is greater than the threshold amplitude or at a second state, e.g., "low" or logic "0", if the digital signal amplitude is less than the threshold amplitude. Output lead 104 is connected to the D input of flip-flop 105. The C or clock input of flip-flop 105 is supplied with a clock signal on lead 106. This clock signal has a frequency equal to the transmission symbol rate of the quaternary signal and is typically generated by recovering the line clock from the signal on lead 101. Accordingly, an output signal is generated on lead 107 of flip-flop 105 which is a replica of the comparator output signal at a clock pulse transition. Such transitions coincide with the signal-eyes and preferably coincide with the time of maximum eye opening. Alignment of the line clock pulse transitions with the times of maximum signal-eye opening can be readily accomplished, for example, by the use of well-known timing recovery circuits.

As will be discussed, the remaining circuitry of FIG. 1 provides a correction signal which drives the threshold amplitude toward a predetermined level which passes only through the region of intersymbol interference in the signal-eye pattern generated by the received digital signal. It should, of course, be understood that the present invention is not limited to quaternary signals but can be used in digital systems having two or more arbitrary signal levels.

Figure 2:
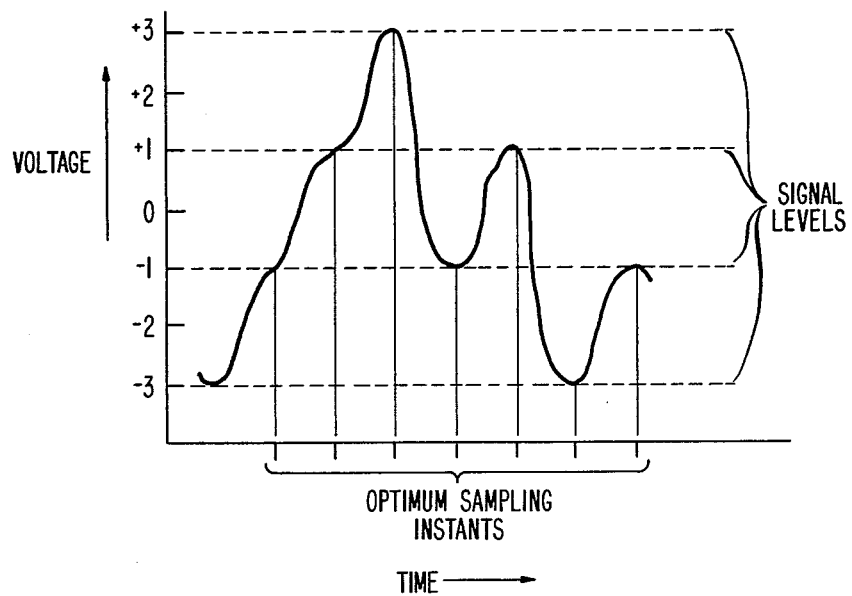
FIG. 2 is a representation of a typical quaternary digital signal.
Figure 3:
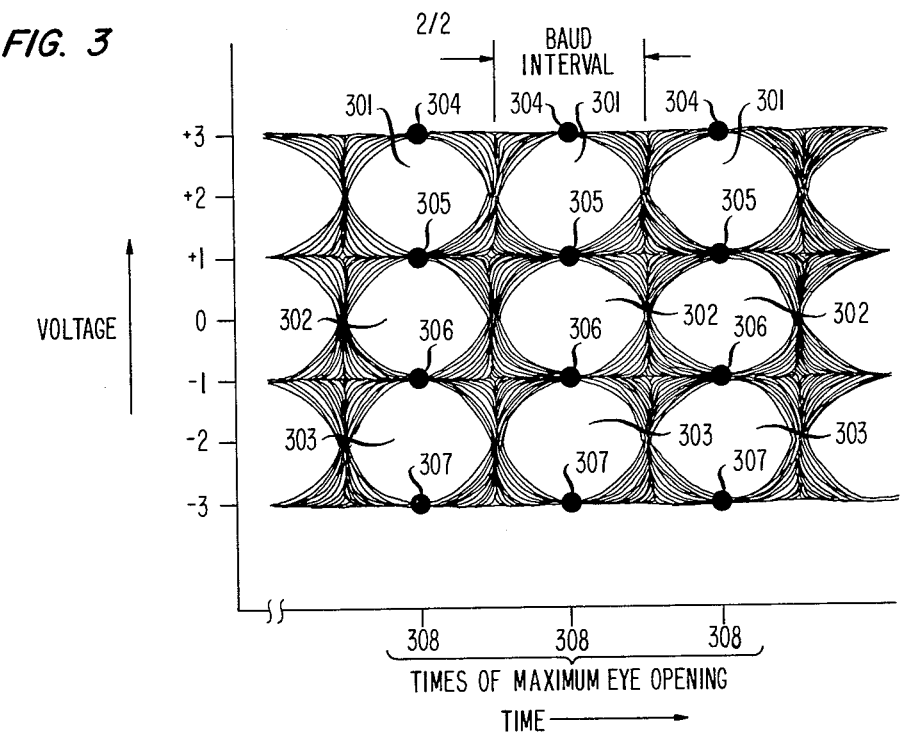
FIG. 3 is a representation of the ideal signal-eye pattern formed by the quaternary signal of FIG. 2.
Figure 4:
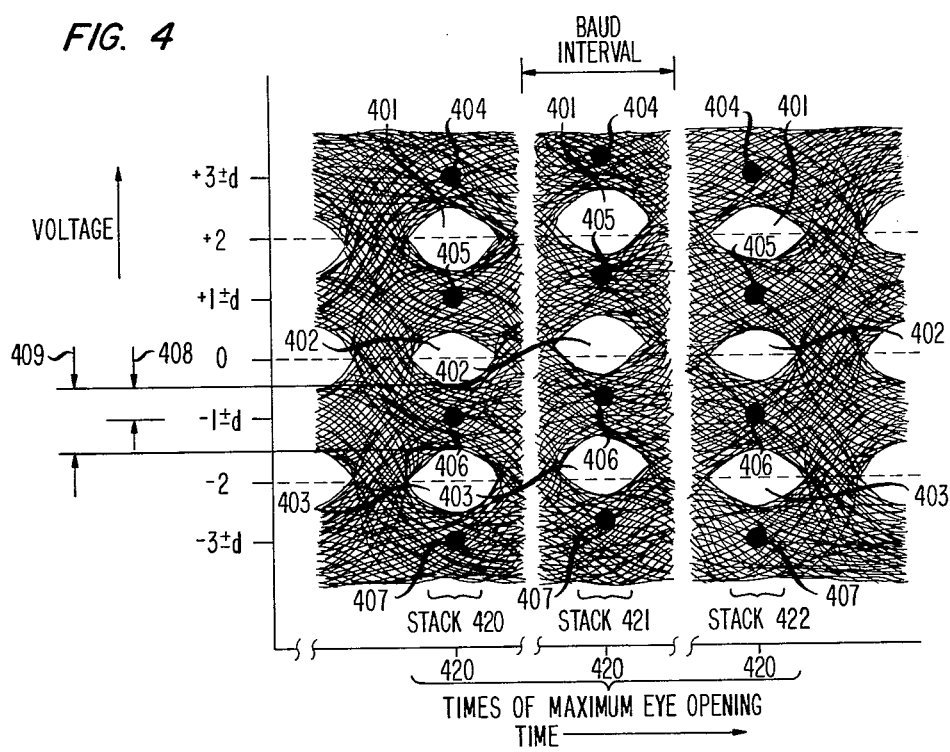
FIG. 4 is a representation of an actual signal-eye pattern formed by the quarternary signal of FIG. 2.

Refer now to FIGS. 2, 3 and 4. An illustrative quaternary signal, as shown in FIG. 2, consists of four signal levels nominally represented by $\pm 1$ and $\pm 3$ volts at the optimum sampling instants. In existing transmission systems, these signal levels are not constant but vary about the nominal voltage values due to a variety of factors, such as fluctuations in the loss of the transmission path and/or uncontrolled variations in the gain of components in the signal path.

In the absence of signal fluctuations, the idealized signal-eye pattern of FIG. 3 is formed by a quaternary signal in the voltage-time domain. The signal-eyes are defined by the ensemble of all possible signal transitions over the baud interval. A signal-eye pattern can be seen by displaying a portion of the quaternary signal on the face of a long persistance cathode ray oscilloscope and superimposing successive quaternary signals thereon. It is apparent, therefore, that the signal-eyes exist not at any one instant of time but over a sufficiently long period for all the possible digital code combinations to occur.

Referring to FIG. 3, a succession of three vertically stacked signal-eyes 301, 302, 303, are generated from the quaternary signal of FIG. 2. Designations 308 represent the optimum sampling times which are the times of maximum eye opening. In general, for a digital signal having n signal levels, where n is an integer, n−1 vertically stacked signal-eyes will be formed. Since there are no spurious signal fluctuations, all signal transitions converge at points at the top and bottom of each signal-eye. These points, referred to as points of convergence, are designated as 304, 305, 306, 307 for the illustrative quaternary signal and have respective voltage amplitudes equal to +3, +1, −1, and −3 volts. Such points of convergence are a desirable threshold. It is known, for example, that a comparison of the amplitude of an incoming digital signal in the receiver of a telecommunications system against a threshold amplitude aligned with a point of convergence provides an ideal signal for driving adaptive transversal equalizers. The problem, however, is that the signal-eye pattern of FIG. 3 does not exist in actual digital transmission systems due to intersymbol interference and other factors.

Refer now to FIG. 4 which shows a typical signal-eye pattern formed by a quaternary signal having signal levels of ±3 and ±1 volts each degraded by some amount up to ±d. While three vertically stacked signal-eyes 401, 402, and 403 are formed, all signal transitions do not converge at preselected points. In fact, the signal-eyes formed are not static but are of changing dimensions and changing positions. Such changes occur slowly over time. Consequently, vertical signal-eye stack 420 is not aligned with subsequent stack 421 which, in turn, is not aligned with succeeding stack 422. A region of intersymbol interference also completely surrounds each signal-eye. While points of convergence 304, 305, 306 and 307 do not exist in FIG. 4, their corresponding locations in FIG. 4 fall within the intersymbol interference region. These corresponding locations, designated as reference points 404, 405, 406 and 407, are offset from each signal-eye boundary by an amount 408 equal to half the separation 409 between signal-eyes 401 and 402 or 402 and 403. Reference points 404, 405, 406 and 407 also are aligned with the times of maximum eye opening 420. It should of course, be understood, that since the signal-eyes 401, 402, and 403 vary in size and position as a function of time, the separation 409 and, hence, the position of reference points 404, 405, 406 and 407 also vary as a function of time.

Referring back to FIG. 1, feedback circuitry 120 generates a reference signal on lead 109 having a frequency dependent upon the statistically expected frequency of logical "1's" on lead 107 when the threshold amplitude on input lead 103 of comparator 102 is aligned with one of the reference points 404, 405, 406 or 407.

Consider the case of a threshold amplitude aligned with point 404. The statistically expected frequency of logic "1's" on lead 107, E(f), can be determined by applying well-known statistical techniques to the actual digital signal statistics. In the disclosed embodiment, E(f) is determined assuming a uniform probability of signal levels. Accordingly, at a sampling instant, i.e., for the leading or trailing edge of a clock pulse on lead 106, there is a ¼ probability that the quaternary signal will be at the highest signal level of +3 volts. Whenever the digital signal is at this level, the finite amount of intersymbol interference present will cause the quaternary signal to be above reference point 404 one-half of the time and below reference point 404 one-half of the time. The net result is that ¼ times ½ or ⅛ of the time, on average, logical "1's" will appear on lead 107. If the threshold is too low, there will be a greater incidence of logical "1's" on lead 107 and if the threshold voltage is too high, there is a lesser incidence of logical "1's".

Using this approach, the expected frequency, of digital signal amplitudes greater than a threshold passing only through the intersymbol interference region at times coinciding with the signal-eyes is governed by:

$$E(f) = \frac{x}{n} + \frac{p}{qn} = \frac{qx + p}{qn} ; \quad (1)$$

where x is the number of signal levels above the particular reference point in the intersymbol interference region;

n is the total number of signal levels; and p/q is a proportionality constant which is a rational fraction where $0 < p/q < 1$. For a threshold aligned with reference points 404, 405, 406 and 407, p/q equals ½.

Equation (1) defines the statistically expected frequency of logic "1's" on lead 107. In general, the determined value of E(f) from equation 1 is used to generate a reference signal by dividing the clock by qn. This reference signal is compared with the signal at the Q output of flip-flop 105 divided by qx+p.

The process of dividing the Q output signal by qx+p is defined as producing a signal having a complete cycle at the output of the qx+p divider for each qx+p clock cycles coincident with the logic "1's" at the output of flip-flop 105. A correction signal is then generated from this comparison to maintain the comparator threshold at the desired location.

This technique advantageously avoids the prior need for precise analog reference voltages. Consider that for E(f)=⅛, a reference signal could be generated having an averge DC voltage set at one-eighth of the difference between the logical "0" and logical "1" level below logical "1". While this technique would work, generating a reference voltage one-eighth of the way between logical "0" and logical "1" presents several problems. First, the logical "0" and "1" levels typically are not precisely controlled. Second, dividing an analog voltage is subject to inaccuracies. Finally, offsets in the feedback loop components show up as offsets in the resulting correction signal.

Refer again to FIG. 1. For a threshold passing through point 404, p/q=½, qn=8 and qx+p=1. The reference signal is generated on lead 109 at the output of divide by eight circuit 108. The input to divide by eight circuit 108 is the clock signal on lead 106. Since qx+p=1, a divide by qx+p circuit need not be coupled to the output of flip-flop 105 and is not shown in FIG. 1. Preferably, divide by N circuits 111 and 112, (N being a large number, e.g., 16) are inserted in the input paths of detector 110. The use of divide by N circuits 111 and 112 reduce the likelihood that the frequency of phase difference compared will exceed the operating range of detector 110. The process of dividing the Q output signal of flip-flop 105 by N is defined as producing a signal having a complete cycle at the output of divide by N circuit 112 for each N clock cycles coincident with logic "1's" at the output of flip-flop 105.

Detector 110 detects the frequency difference and generates a signal on lead 113 having a dc component which varies with the frequency difference between the signals on leads 115 and 116. The frequency difference detection capability is necessary in order to move the threshold into the intersymbol interference region. This is analogous to the acquisition process of a phase-locked loop. The phase detection process also generates a signal on lead 113 having a dc component which varies with the phase difference between the signals on leads 115 and 116. The dc component produced by the phase difference maintains the threshold position once the acquisition process is completed or "lock" has been achieved. This is analogous to tracking in a phase-locked loop. The above-described capability of detector 110 can be realized using a commercially available device such as phase-frequency detector MC12040 manufactured by MOTOROLA Semiconductor Products, Inc.

The dc signal component on lead 113 is supplied to lead 103 after passing through loop filter 114. Loop filter 114 is preferably a high-gain active filter which provides the circuitry of FIG. 1 with a second order loop configuration. Filter 113 can be active or passive and, if desired, can comprise an integrator. The performance of the overall circuitry is governed by the same well-known equations which govern phase-locked loops.

The foregoing discussion has centered on operation of the adaptive threshold circuit about reference point 404. The schematic diagram of FIG. 1 can be easily modified for operation about reference points 405, 406 and 407. Applying equation (1) the values of E(f) on lead 107 are $\frac{3}{8}$, $\frac{5}{8}$ and $\frac{7}{8}$, respectively. Therefore, operation about reference points 405, 406 and 407 respectively requires the addition of a divide by 3, divide by 5, or divide by 7 circuit inserted between the Q output of flip-flop 105 and lead 116. It should, of course, be understood that divide by 8 circuit 108 must also be modified for circuit operation about any point in the intersymbol interference region between stacked signal-eyes formed by a digital signal having an arbitrary number of levels. In the most generic case, a divide by qx+p is required between the Q output of flip-flop 105 and lead 116 and a divide by qn circuit is used in lieu of divide by 8 circuit 108. Use of these generically defined dividing circuits insures that the signals supplied to detector 110 both have the same frequency when the threshold is at the desired level.

Furthermore, the principle of operation of the disclosed invention is unchanged if, rather than operating on the expected frequency of occurrence of logical "1's" at the Q output of flip-flop 105, operation is based on the expected frequency of occurrence of "0's" on the $\overline{Q}$ output of flip-flop 105. In this case, the preceding discussion remains accurate if all references to the expected frequency of occurrence of logic "1's" are replaced by references to the expected frequency of occurrence of logic "0's", and if the variable x is redefined to be the number of levels below the desired reference level.

It should also be noted that the present invention can also be utilized to provide a threshold passing through the signal-eyes. In such applications, a voltage divider is merely coupled to leads 103 in threshold circuits operating in the intersymbol interference regions above and below the signal-eye through which a threshold is desired.

What is claimed is:

1. Apparatus for use in a digital transmission system wherein the digital signal forms at least one reoccurring signal-eye surrounded by a region of intersymbol interference in the voltage-time domain, said apparatus being characterized by
   means (e.g., 102, 105) for sensing the amplitude of the digital signal relative to a threshold at discrete times which coincide with said signal-eye; and
   means (e.g., 108, 110, 114) responsive to the sensed amplitude for generating a correction signal which drives said threshold solely toward a predetermined level relative to said signal-eye, said level passing only through said region of intersymbol interference.

2. The apparatus of claim 1 wherein said predetermined level passes through a location (e.g., 404, 405, 406, or 407) in said region of intersymbol interference corresponding to a point of convergence.

3. The apparatus of claims 1 or 2 wherein the discrete times coincide with the times of maximum signal-eye opening.

4. The apparatus of claim 1 wherein said sensing means generates an output signal having either a first (e.g., logic "1") or a second (e.g., logic "0") state at said discrete times.

5. The apparatus of claim 4 wherein said correction signal generating means divides the number of said first states by qx+p and divides the discrete times by qn where x is the number of signal levels above said predetermined level, n is the total number of digital signal levels and p/q is a rational fraction where $0 < p/q < 1$.

6. The apparatus of claim 5 wherein p/q equals $\frac{1}{2}$.

7. The apparatus of claim 6 wherein the discrete times coincide with the times of maximum signal-eye opening.

8. The apparatus of claim 4 wherein said correction signal generating means divides the number of said second states by qx+p and divides the discrete times by qn where x is the number of signal levels below said predetermined level, n is the total number of digital signal levels and p/q is a rational fraction where $0 < p/q < 1$.

9. The apparatus of claim 8 wherein p/q equals $\frac{1}{2}$.

10. The apparatus of claim 9 wherein the discrete times coincide with the times of maximum signal-eye opening.

* * * * *